US011961358B2

(12) United States Patent
Olive et al.

(10) Patent No.: US 11,961,358 B2
(45) **Date of Patent: *Apr. 16, 2024**

(54) GAMING SYSTEM WITH SYMBOL-DRIVEN APPROACH TO RANDOMLY-SELECTED TRIGGER VALUE FOR FEATURE

(71) Applicant: Aristocrat Technologies Australia Pty Limited, North Ryde (AU)

(72) Inventors: Scott Olive, Brookvale (AU); Matthew Deitz, Dee Why (AU); Liam Sanders, Neutral Bay (AU)

(73) Assignee: Aristocrat Technologies Australia PTY Limited, North Ryde (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/131,094

(22) Filed: Apr. 5, 2023

(65) Prior Publication Data

US 2023/0237865 A1 Jul. 27, 2023

Related U.S. Application Data

(63) Continuation of application No. 17/958,032, filed on Sep. 30, 2022, now Pat. No. 11,640,744, which is a
(Continued)

(30) Foreign Application Priority Data

Oct. 14, 2019 (AU) ................................ 2019903852
Sep. 28, 2020 (AU) ................................ 2020244390

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/34* (2013.01)

(58) Field of Classification Search
None
See application file for complete search history.

(56) References Cited

U.S. PATENT DOCUMENTS

D262,460 S 12/1981 Belhumeur
4,503,808 A 3/1985 McAlister
(Continued)

OTHER PUBLICATIONS

Notice of Allowance dated Mar. 4, 2021 for U.S. Appl. No. 29/725,591 (pp. 1-11).
(Continued)

*Primary Examiner* — Robert T Clarke, Jr.
(74) *Attorney, Agent, or Firm* — Brownstein Hyatt Farber Schreck, LLP

(57) ABSTRACT

A gaming system randomly selects a trigger value for a feature, which starts when the current value of a symbol counter reaches the trigger value. In some examples, a gaming system includes memory that stores data defining reel strips. When a symbol counter is initialized, an initial value of the symbol counter is randomly selected from a range of allowable initial values having an upper limit. A trigger value is randomly selected from a range between the initial value and a ceiling value, which is greater than the upper limit. For each of one or more instances, symbols are selected from the reel strips for display, and the current value of the symbol counter is incremented based on the count of designated symbols, if any, among the selected symbols. Responsive to the current value of the symbol counter reaching the trigger value, the feature is started.

20 Claims, 15 Drawing Sheets

Related U.S. Application Data continuation of application No. 17/069,743, filed on Oct. 13, 2020, now Pat. No. 11,482,070.

(56) References Cited

U.S. PATENT DOCUMENTS

| | | | | |
|---|---|---|---|---|
| D423,484 | S | 4/2000 | Dangelmaier | |
| D539,297 | S | 3/2007 | Noviello | |
| D555,660 | S | 11/2007 | Noviello | |
| D590,407 | S | 4/2009 | Watanabe | |
| D593,108 | S | 5/2009 | Danton | |
| D611,489 | S | 3/2010 | Bell | |
| 8,398,480 | B2 | 3/2013 | Visser | |
| 9,807,971 | B1 | 11/2017 | Foresman | |
| D830,372 | S | 10/2018 | Gratzki | |
| D840,429 | S | 2/2019 | Kroon | |
| D878,397 | S | 3/2020 | Gratzki | |
| D879,835 | S | 3/2020 | Höhne | |
| D904,452 | S | 12/2020 | Kroon | |
| 11,482,070 | B2 * | 10/2022 | Olive | G07F 17/3209 |
| 11,640,744 | B2 * | 5/2023 | Olive | G07F 17/3213 463/20 |
| 2006/0281528 | A1 | 12/2006 | Hall | |
| 2012/0004033 | A1 | 1/2012 | Lyons | |
| 2016/0042597 | A1 | 2/2016 | Olive | |
| 2016/0092065 | A1 | 3/2016 | Hilbert | |
| 2016/0360994 | A1 | 12/2016 | Rettedal | |
| 2017/0154498 | A1 | 6/2017 | Olive | |
| 2017/0164580 | A1 | 6/2017 | Rettedal | |
| 2019/0051113 | A1 * | 2/2019 | Marks | G06F 7/582 |
| 2019/0180092 | A1 | 6/2019 | Foresman | |
| 2020/0074791 | A1 | 3/2020 | Uberuaga | |
| 2020/0111312 | A1 | 4/2020 | Olive | |

OTHER PUBLICATIONS

Helix—Aristocrat gaming, https://www.youtube.com/watch?v=6Hw6-FCG82E&feature=emb_logo (Year: 2014).

White Buffalo Slot Machine Final Art- patbollin, https://www.deviantart.com/patbollin/art/White-Buffalo-Slot-Machine-Final-Art-433359299 (Year: 2014).

Casino life June Jul. 2015 Technology in Casinos by Casino Life Magazine—issuu, https://issuu.com/peterwhite3/docs/ casino_lifejune_2015_techno_high_r/6 (Year: 2015).

The P-42V Up Curved slot Cabinet, https://www.youtube.com/watch?v=5wMzyDvyOXs (Year: 2017).

Labor Day Pays Off for Soboba Casino Local Winning $3.2 Million, https://www.prweb.com/releases/2017/09/prweb14675060.htm (Year: 2017).

Aristocrat Wins Awards for System, Game, Cabinet Ahead of NIGA Trade Show I Casino Life Magazine, https://www.casinolifemagazine.com/news/aristocrat-wins-awards-system-game-cabinet-ahead-niga-trade-show (Year: 2018).

G2E New Buffalo Xtreme slot machine preview—NG Slot, https://www.youtube.com/watch?v=FGhco7UybbY (Year: 2018).

Rocky Gap Casino Resort—Facebook, https://www.facebook.com/RockyGap/photos/come-hit-the-jackpot-on-our-new-huge-konami-solstice-slot-machines/10156441776859219/ (Year: 2018).

Our slots are on fire—facebook, https://www.facebook.com/RockyGap/posts/our-slots-are-on-one-lucky-winner-hit-a-2395073-jackpot-on-our-dancing-drums-slo/10156868874339219/ (Year: 2019).

TESS 86062772, tmsearch.uspto.gov/bin/gate.exe?f=doc&state=4807:ydkh84.3.372 (Year: 2013).

TESS 90027384, tmsearch.uspto.gov/bin/gate.exe?f=doc&state=4807:ydkh84.3.3 (Year: 2020).

Notice of Allowance dated Mar. 4, 2021 for U.S. Appl. No. 29/725,598 (pp. 1-11).

Notice of Allowance dated Mar. 11, 2021 for U.S. Appl. No. 29/725,607 (pp. 1-10).

Graphic Mascot Image of Buffalo Bison Head, https://depositphotos.com/6570833/ stock-illustration-buffalo-bison- mascot-head-graphic.html (Year: 2011).

Buffalo head logo mascot emblem—belopoppa, https://depositphotos.com/143892549/stock-illustration-buffalo-head-logo-mascot.html (Year: 2017).

Retro style illustration of head of an american bison - patrimonio, https://depositphotos.com/170758490/ stock-illustration-american-bison-head-retro.html (Year: 2017).

Buffalo Grand Max bet—Slotlady, https://www.youtube.com/watch?v=Qxc_55aau0w (Year: 2018).

Buffalo or bull head outline icon—filkusto, https://depositphotos.com/204763438/stock-illustration-buffalo-bull-head-outline-icon.html (Year: 2018).

EmojiOne Animations—Neufeld, https://blog.joypixels.com/emojione-animations-now-available/ (Year: 2018).

Jackpot! Handpay!—Slotmanjack, https://www.youtube.com/watch?v=fXI25Q663io (Year: 2019).

TESS 85975552, tmsearch.uspto.gov/bin/gate.exe?f=doc&state=4807:ydkh84.3.436 (Year: 2010).

TESS 87670897, tmsearch.uspto.gov/bin/gate.exe?f=doc&state=4807:ydkh84.3.186 (Year: 2017).

Corrected Notice of Allowability dated Apr. 5, 2021 for U.S. Appl. No. 29/725,591 (pp. 1-2).

Office Action dated Jun. 7, 2022 for U.S. Appl. No. 29/782,332 (pp. 1-7).

(Game UI) How to Create Resume, Restart and Quit Buttons—GraphicVision, https://www.youtube.com/watch? v=aQXF4uK5AXs ( Year: 2017).

Excel VBA—Code39,https://superuser.com/questions/1092680/excel-vba-loop-to-fill-in-sequence-numbers-in-a-column (Year: 2016 ).

Further Refined Cross Platform Mobile GUI Builder—Almog, https://www.codenameone.com/blog. further-refined-cross-platform-mobile-gui-builder.htm (Year: 2016).

Office Action dated Jun. 7, 2022 for U.S. Appl. No. 29/782,337 (pp. 1-7).

From Figma to React material design buttons—Kamushken, https://setproduct.com/blog/figma-to-react-buttons (Year: 2019).

Notice of Allowance dated Jul. 27, 2022 for U.S. Appl. No. 29/782,332 (pp. 1-7).

Notice of Allowance dated Jul. 27, 2022 for U.S. Appl. No. 29/782,337 (pp. 1-7).

Office Action (Notice of Allowance and Fees Due (PTOL-85)) dated Sep. 1, 2022 for U.S. Appl. No. 17/069,743 (pp. 1-8).

Office Action (Notice of Allowance and Fees Due (PTOL-85)) dated Mar. 7, 2023 for U.S. Appl. No. 17/958,032 (pp. 1-7).

* cited by examiner

300

| | REEL STRIP POSITION | REEL 1 (341) | REEL 2 (342) | REEL 3 (343) | REEL 4 (344) | REEL5 (345) |
|---|---|---|---|---|---|---|
| 301 | 1 | PIC 1 | 10 | PIC 1 | Q | PIC 1 |
| 302 | 2 | PIC 1 | Q | PIC 1 | A | 10 |
| 303 | 3 | PIC 1 | K | PIC 1 | 10 | A |
| 304 | 4 | PIC 1 | PIC 1 | PIC 1 | WILD | WILD |
| 305 | 5 | Q | A | Q | PIC 2 | PIC 2 |
| 306 | 6 | 10 | PIC 1 | K | J | A |
| 307 | 7 | Q | PIC 1 | K | PIC 1 | Q |
| 308 | 8 | PIC 2 | PIC 1 | WILD | K | PIC 3 |
| 309 | 9 | A | PIC 1 | 10 | Q | 9 |
| 310 | 10 | 9 (354) | PIC 1 | PIC 1 | K | J |
| 311 | 11 | PIC 2 (351) | PIC 5 | 9 | PIC 1 | A |
| 312 | 12 | 10 (352) | 9 | PIC 5 | PIC 1 | K |
| 313 | 13 | PIC 1 (353) | K | A | PIC 1 | K |
| 314 | 14 | PIC 3 | 9 | Q | PIC 1 | PIC 4 |
| 315 | 15 | K | WILD | J | PIC 2 | 9 |
| 316 | 16 | K | 10 | 10 | 9 | WILD |
| 317 | 17 | J | WILD | 10 | A | K |
| 318 | 18 | PIC 1 | PIC 2 | WILD | A | PIC 1 |
| 319 | 19 | PIC 1 | Q | PIC 2 | 10 | PIC 1 |
| 320 | 20 | PIC 1 | PIC 1 | PIC 3 | PIC 3 | K |
| 321 | 21 | PIC 1 | PIC 1 | PIC 3 | PIC 3 | K |
| 322 | 22 | J | PIC 1 | PIC 4 | PIC 4 | PIC 2 |
| 323 | 23 | PIC 3 | PIC 1 | K | 10 | Q |
| 324 | 24 | 9 | PIC 1 | 10 | J | PIC 1 |
| 325 | 25 | PIC 5 | PIC 1 | PIC 1 | PIC 1 | PIC 1 |
| 326 | 26 | A | 4 | PIC 1 | 9 | PIC 1 |
| 327 | 27 | 10 | SCAT | PIC 1 | 10 | PIC 1 |
| 328 | 28 | PIC 4 | K | PIC 1 | WILD (331) | 10 |
| 329 | 29 | 9 | 10 | J | Q | PIC 2 |
| 330 | 30 | Q | Q | PIC 4 | K | J |

FIG. 3

GAMING SYSTEM WITH SYMBOL-DRIVEN APPROACH TO RANDOMLY-SELECTED TRIGGER VALUE FOR FEATURE

CROSS REFERENCE TO RELATED APPLICATIONS

This application is a continuation of U.S. patent application Ser. No. 17/958,032, filed Sep. 30, 2022, which is a continuation of U.S. patent application Ser. No. 17/069,743, filed Oct. 13, 2020, now U.S. Pat. No. 11,482,070, which claims priority to Australian Patent Application No. 2019903852, filed Oct. 14, 2019, and Australian Patent Application No. 2020244390, filed Sep. 28, 2020, the disclosures of which are hereby incorporated by reference.

FIELD

The present application relates to a gaming system, a gaming device and methods of operating the gaming system and the gaming device.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out.

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator ("RNG") to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

One described embodiment provides a gaming device, a method of operating a gaming device, and a gaming system where a feature game is triggered if the collection of designated symbols across a plurality of game instances results in a mystery trigger value being reached. In an example, the feature game is selected at random from a plurality of feature games.

Another described embodiment provides a gaming system comprising a plurality of gaming devices and a link controller, and a method of operating the gaming system. The gaming devices are configured to notify the link controller of wins satisfying a criterion, e.g., a jackpot win at a gaming device, after which the link controller, controls at least the non-winning gaming devices to output a win celebration, preferably a win celebration sound in synchronization.

In one example embodiment, a gaming device comprises a display, a processor, and a memory storing (i) data defining a set of reel strips, and (ii) instructions. When the instructions are executed by the processor, they cause the processor to initialize a symbol counter in response to a reset condition being met by randomly selecting a symbol counter initial value from a defined range of allowable symbol counter initial values having an upper limit, and randomly select a trigger value from a range defined between the selected symbol counter initial value and a symbol counter ceiling value, wherein the ceiling value is greater than the upper limit of the range of allowable symbol counter initial values. In each game instance, the processor controls the display to display a current value of the symbol counter and the ceiling value of the symbol counter, selects symbols from the set of reel strips for display on the display in a plurality of columns of symbol positions, and increments the symbol counter based on a number of designated symbols included in the selected symbols. Responsive to the symbol counter reaching the trigger value, the processor awards a feature game.

Another example embodiment provides a method of operating a gaming device comprising a display. The method comprises initializing a symbol counter in response to a reset condition being met by randomly selecting a symbol counter initial value from a defined range of allowable symbol counter initial values having an upper limit, and randomly selecting a trigger value from a range defined between the selected symbol counter initial value and a symbol counter ceiling value, wherein the ceiling value is greater than the upper limit of the range of allowable symbol counter initial values. In each game instance, the method comprises controlling the display to display a current value of the symbol counter and the ceiling value of the symbol counter, selecting symbols from a set of reel strips for display on the display in a plurality of columns of symbol positions, and incrementing the symbol counter based on a number of designated symbols included in the selected symbols. The method also comprises, responsive to the symbol counter reaching the trigger value, awarding a feature game.

Another example embodiment provides a gaming system comprising one or more processors and at least one memory storing (i) data defining a set of reel strips; and (ii) instructions. When the instructions are executed by the one or more processors, they cause the one or more processors to initialize a symbol counter in response to a reset condition being met by randomly selecting a symbol counter initial value from a defined range of allowable symbol counter initial values having an upper limit, and randomly select a trigger value from a range defined between the selected symbol counter initial value and a symbol counter ceiling value, wherein the ceiling value is greater than the upper limit of the range of allowable symbol counter initial values. In each game instance, the one or more processors control a display to display a current value of the symbol counter and the ceiling value of the symbol counter, select symbols from the set of reel strips for display on the display in a plurality of columns of symbol positions, and increment the symbol counter based on a number of designated symbols included in the selected symbols. Responsive to the symbol counter reaching the trigger value, the one or more processors award a feature game.

Another example embodiment provides a gaming system comprising a link controller comprising a processor, and a memory storing link controller instructions, and a plurality of gaming devices. Each gaming device comprises a display, a processor, and a memory storing gaming device instructions which when executed cause the respective gaming device processors to (i) conduct a game including by displaying game outcomes on the respective displays, and (ii) responsive to a defined winning condition being met, communicate occurrence of the winning condition being met to the link controller. When the link controller instructions are executed by the processor of the link controller, they cause the link controller to respond to a communication of the occurrence of the winning condition from one of the plurality of gaming devices by communicating a win celebration command to at least each other gaming device of the plurality of gaming devices. When the gaming device instructions are executed by the gaming device processor, they cause at least each other gaming device to respond to receipt of the win celebration command by outputting a win celebration.

Another example embodiment provides a method of operating a gaming system comprising a link controller and a plurality of gaming devices, each gaming device comprising a display. The method comprises operating each active gaming device of the plurality of gaming devices to conduct a game including displaying game outcomes on the display of the respective gaming device, responsive to a defined winning condition being met at one of the gaming devices, communicating occurrence of the winning condition being met to the link controller, responding, by the link controller, to a communication of the occurrence of the winning condition from one of the plurality of gaming devices by communicating a win celebration command to each other gaming device of the plurality of gaming devices, and responding by at least each other gaming device to receipt of the win celebration command, by outputting a win celebration.

BRIEF DESCRIPTION OF THE DRAWINGS

FIG. 3 illustrates an example reel strip layout.

DETAILED DESCRIPTION

A gaming system randomly selects a trigger value for a feature, which starts when the current value of a symbol counter reaches the trigger value. For example, a gaming system includes memory that stores data defining a set of reel strips and further stores computer-executable instructions that, when executed, cause one or more processors to perform operations. The operations include initializing a symbol counter. When the symbol counter is initialized, an initial value of the symbol counter is randomly selected from a range of allowable initial values having an upper limit. The operations further include randomly selecting a trigger value from a range between the initial value and a ceiling value, which is greater than the upper limit. For an instance of a base game, the operations include selecting symbols from the set of reel strips for display. For the instance of the base game, the operations further include incrementing the current value of the symbol counter based on the count of designated symbols, if any, among the selected symbols. Responsive to the current value of the symbol counter reaching the trigger value, the feature is started.

This mechanism for triggering a feature can improve usability of electronic gaming devices in the gaming system and enhance the user experience. In some cases, the symbol counter tracks the cumulative count of designated symbols across multiple instances of the base game, while the trigger value remains hidden, which can increase user anticipation as the current value of the symbol counter increases. By controlling the range for the randomly-selected initial value of the symbol counter and controlling the range for the trigger value, this mechanism provides a useful tool for managing volatility and return to player ("RTP") in a computationally-effective way, while also improving usability and enhancing the user experience.

Figure 1:
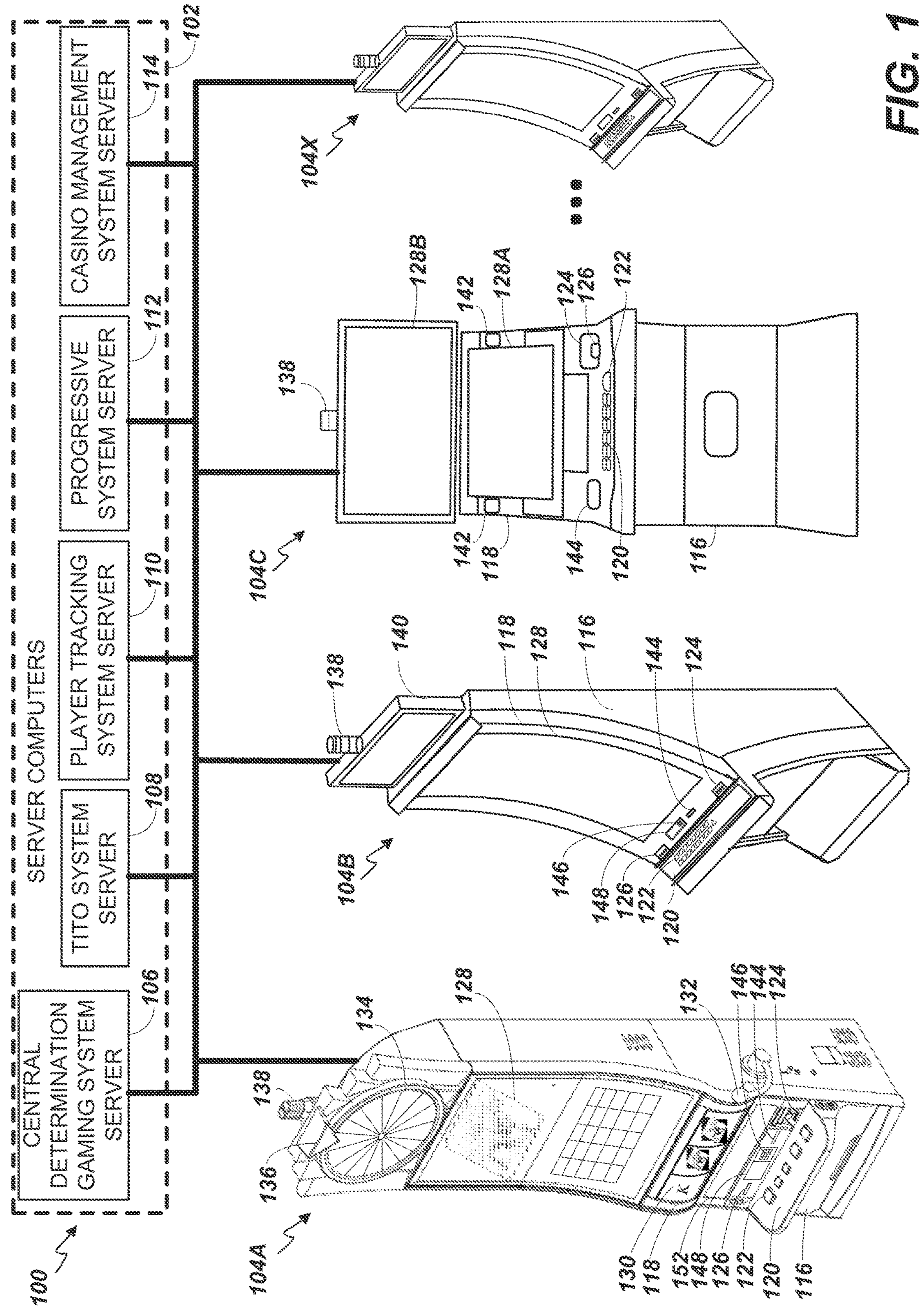
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out ("TITO") system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
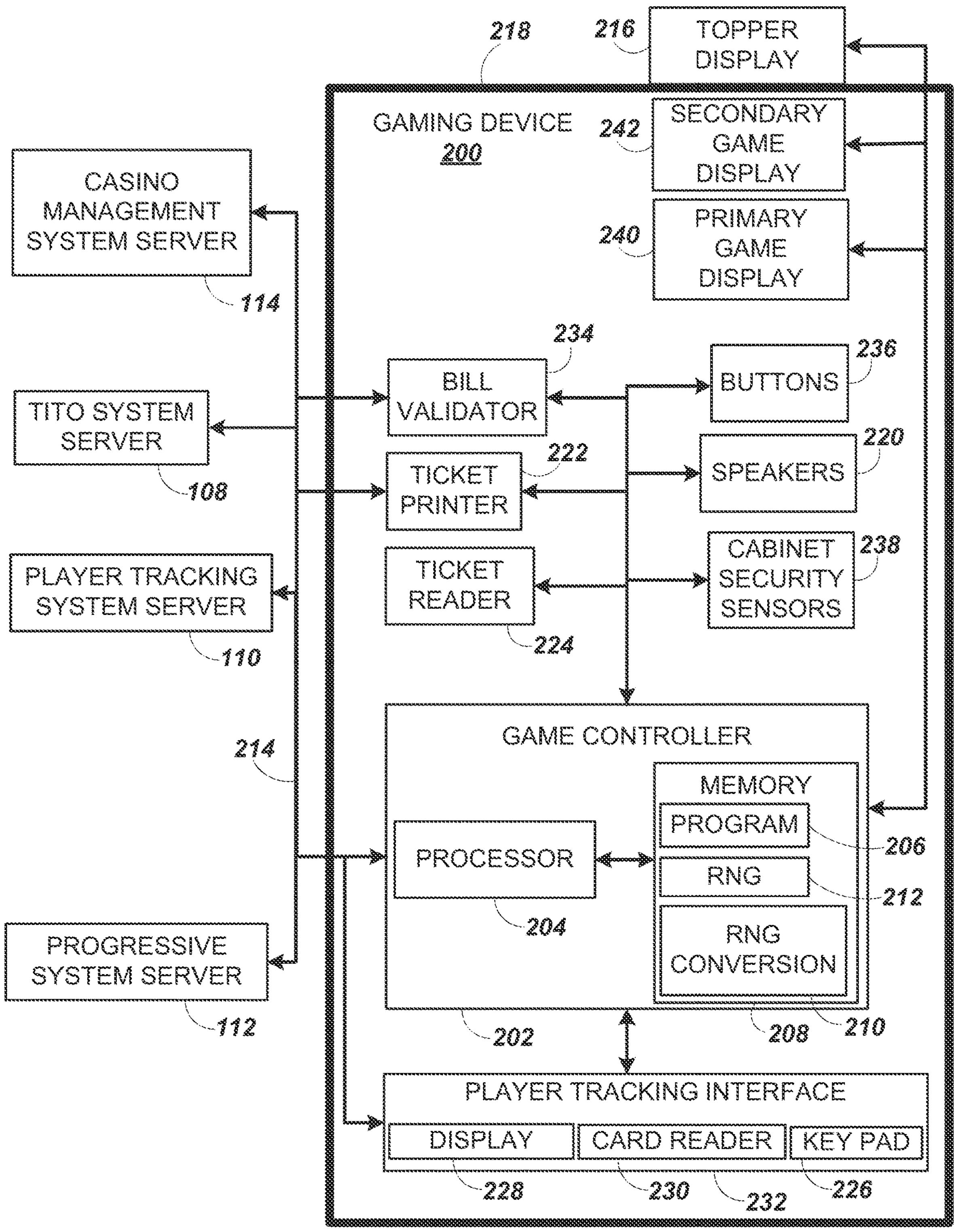
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator ("RNG") 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory ("ROM")) or from the central determination gaming system server 106 to memory

208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
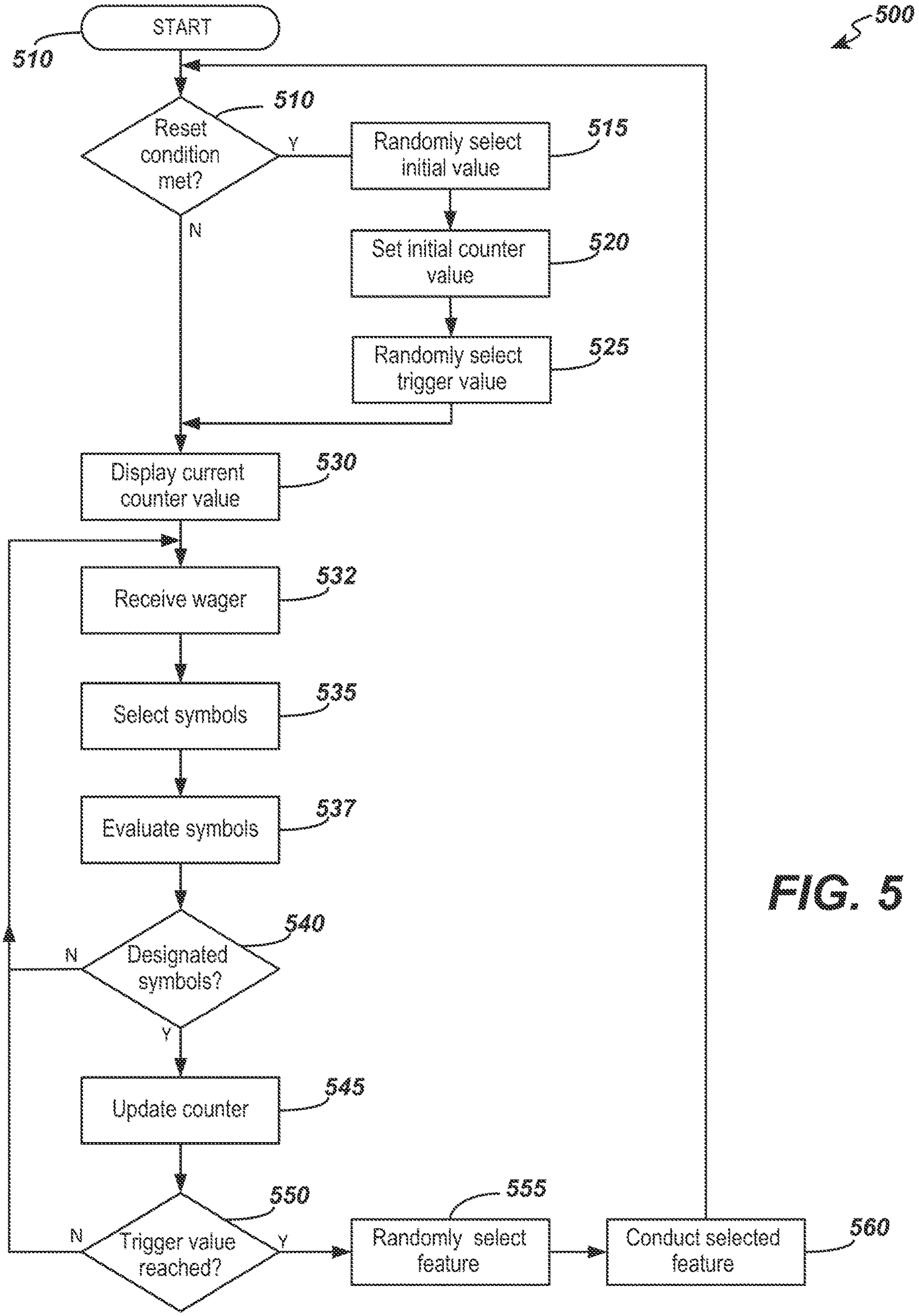
FIG. 5 is flow chart of a method of operating a gaming device.

FIG. 5 is a flow chart of an embodiment of operating a gaming device 200. In one example, at step 505, the method starts responsive to a player starting a gaming session at the gaming device, e.g., by establishing a credit balance or inserting a player card. In other examples, the method may start when the gaming device is initialized.

At step 510, processor 204, determines whether a reset condition is met. In an example, there are two reset conditions other than when the gaming device is first initialized: (i) that a new gaming session has been started, and (ii) that a feature game has been awarded. In other examples, a new gaming session may not be a reset condition such that the value of the designated symbol counter described below persists until it is reset by a feature game being awarded.

Where the reset condition is met, the processor 204 proceeds to step 515 and randomly selects an initial value for a designated symbol counter using random number generator 212. In one example, a routine implemented by RNG is configured to receive data defining a range from the processor 204 (e.g., data defining that the RNG should return an integer between a start number and an end number) and return a value within the defined range. In an example, processor 204 request RNG 212 to return a value between 1100 and 1400.

At step 520, processor sets the value returned from RNG 212 as the symbol counter initial value. The counter initial value will be displayed on display 240 at step 530.

Figure 6:
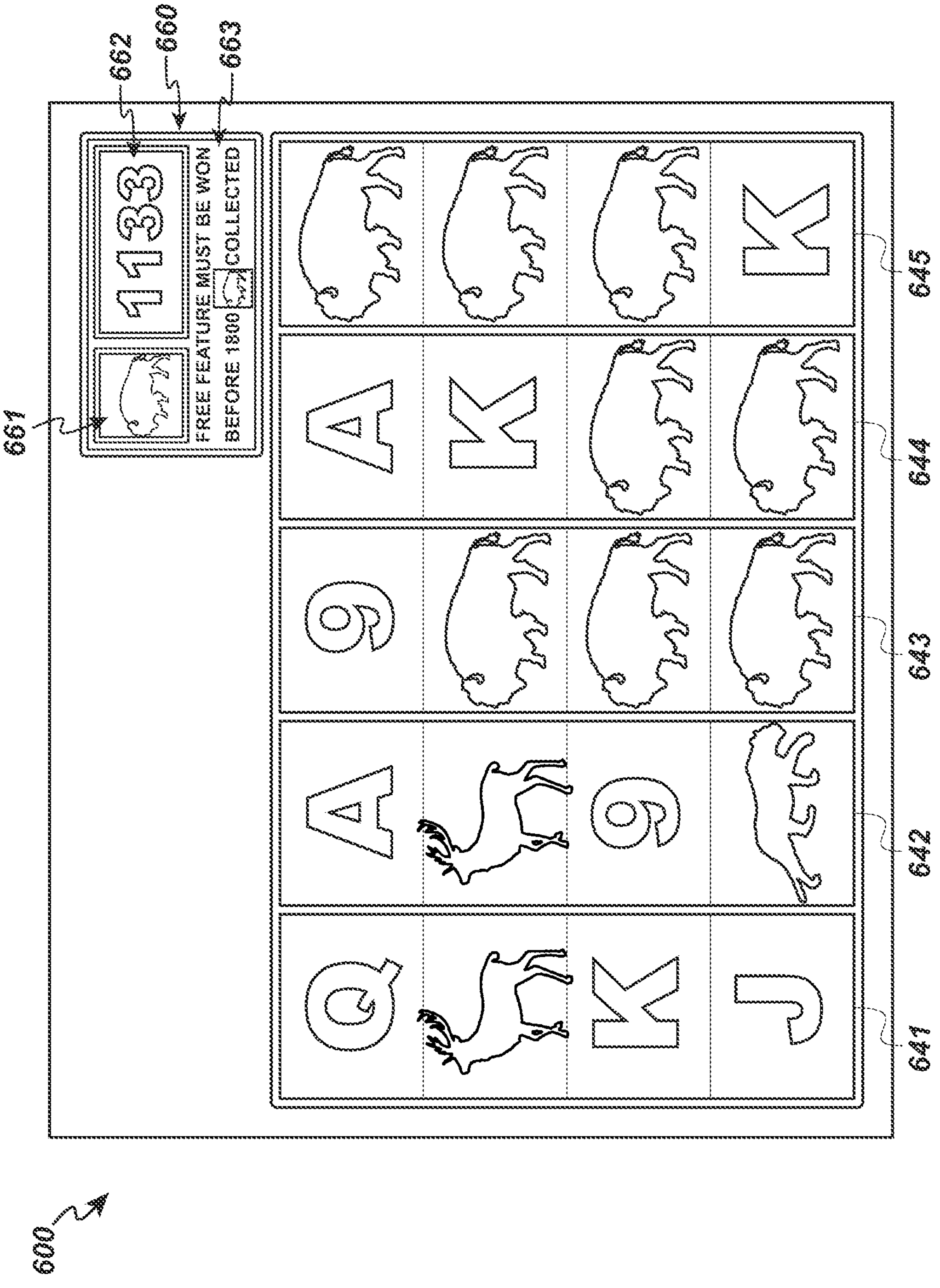
FIGS. 6 to 12 are example screen displays.

FIG. 6 is an example screen display where the counter graphic 660 is displayed in conjunction with a spinning reel game having five columns of symbol positions 641-645, each having four symbol positions.

Counter graphic 660 displays a current counter value 662, which in this example is an initial value "1133." Counter graphic 660 also shows the designated symbol 661 (a "Buffalo" symbol) and has a message 663 indicating that a "Free feature must be won before 1800 [designates symbols] collected."

At step 525, processor uses RNG 212 to select a trigger value. To do so, the processor supplies data defining a range between the initial value (e.g., 1133) and a defined ceiling value (e.g., 1800). RNG 212 returns a value in this range and processor 204 stores the returned value as a hidden trigger value in memory 208.

At step 532, the processor 204 receives a wager and hence initiates a game instance (typically called a "base game"). At step 535, processor 204 selects symbols from a set of reel strips stored in memory 208 that include the designated symbol.

FIG. 3 illustrates an example of a set 300 of five reel strips 341, 342, 343, 344, 345. In the example, each reel strip has thirty reel strip positions 301-330. Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the game reel strips depends on factors such as the number of wild symbols (in general, the more wilds there are, the longer the reel strip needs to be to maintain the target RTP) and volatility (in general, the higher the prize value is, the longer the reel strip needs to be to lower the hit rate to maintain the target RTP). In this example, the reel strips have "stacks" of the designated symbol, here the "Pic 1" symbol. That is, each reel strip has a number of consecutive reel strip positions occupied by the Pic 1 symbol, thus forming a stack. See, for example, the first to fourth reel strip positions 301-304 of the first reel 341. Stacks of symbols enable the symbol to be more readily seen during spinning of the reel strips and also allow more than one of the symbol that is stacked (here, Pic 1) to be selected. In the example, the Pic 1 symbol takes the form of a Buffalo, and an example of the symbol 661 is included within counter graphic 660 to communicate to the player that this is the designated symbol to be collected in order to trigger a feature game.

Figure 4:
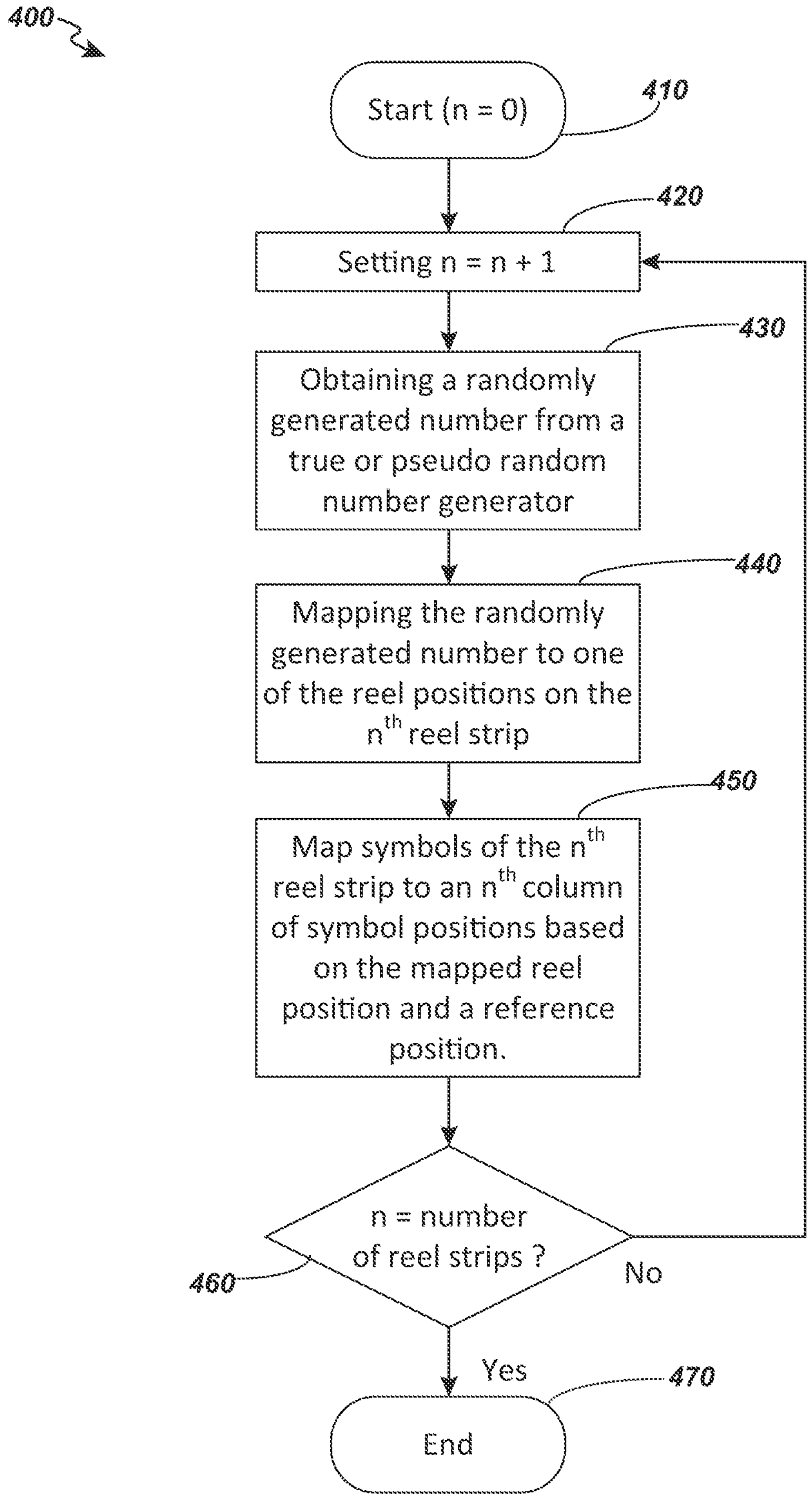
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the $n^{th}$ reel strip to an $n^{th}$ column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are three other symbol positions in the column of symbol positions and hence symbols at three neighboring reel strip positions are also mapped to the symbol positions of the column. Referring to the example reel strips of FIG. 3, if the value returned by the RNG 212 is mapped to reel position 313, then for the first reel strip 341, "Pic 1" symbol 353 is mapped to a bottom symbol position, "10" symbol 352 is mapped to the symbol position immediately above, "Pic 2" symbol 351 is mapped to the next symbol position, and "9" symbol is mapped to a top symbol position of the column.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions, after which the symbol selection process ends 470. In other examples, different numbers of symbols may be mapped to different numbers of symbol positions, e.g., 3 symbols to 3 symbol positions.

After the symbols of all reel strips have been mapped to symbol position, the processor 204 controls display 240 to display them at the symbol positions.

At step 537, processor 204 evaluates the selected symbols for winning combinations based on the received wager and a pay table stored in memory 208.

Figure 7:
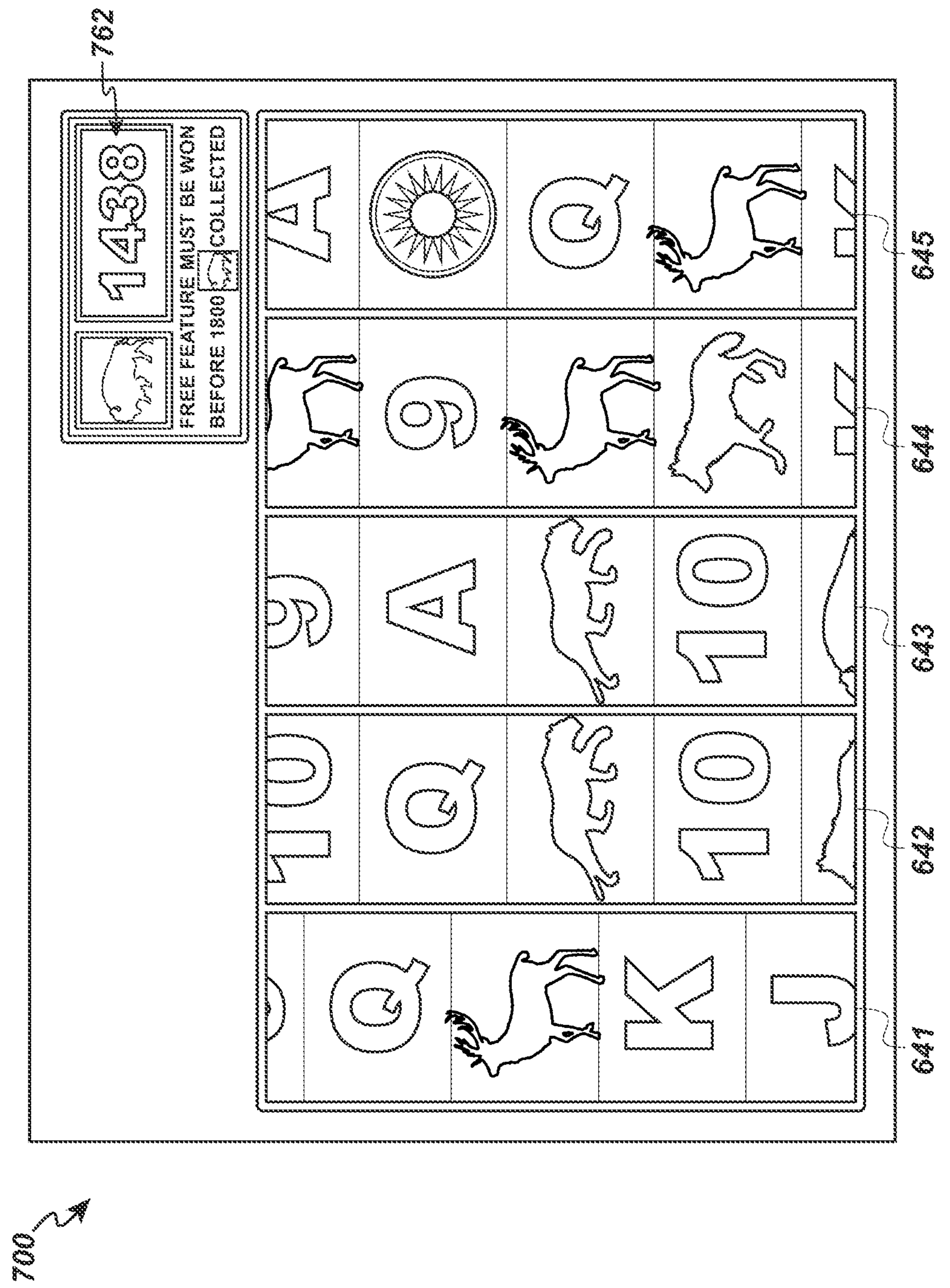

At step 540, processor 204 determines whether the selected symbols include one or more designated symbols and, if they do, at step 545 updates the designated symbol counter. In an example, processor 204 updates the symbol counter dynamically as the symbols land. In this respect, FIG. 7 is an example screen display 700 where a current counter value 762 is "1438" and the reel strips corresponding to each of the columns 641-645 are simulated as spinning.

Figure 8:
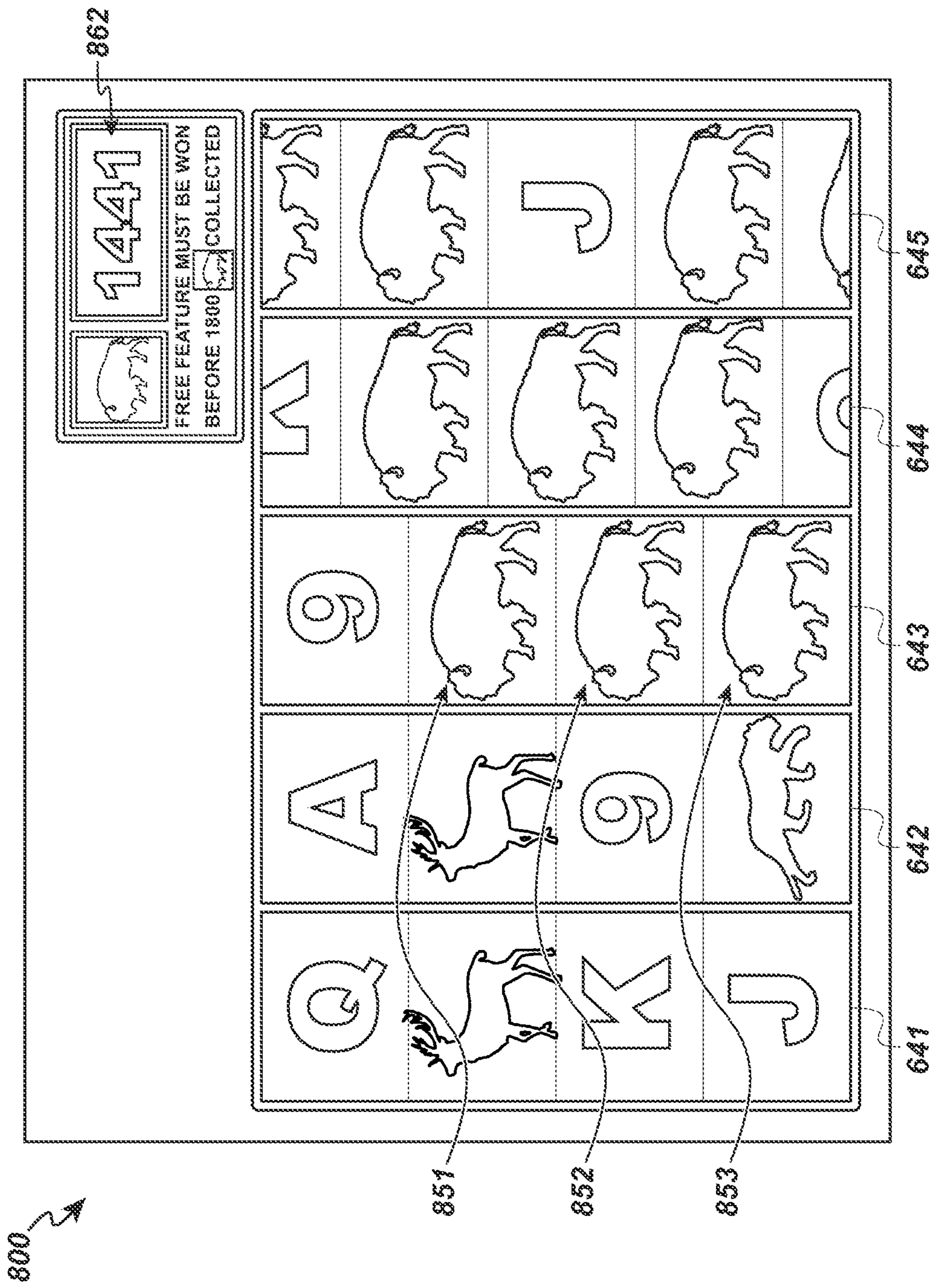

FIG. 8 is an example screen display 800 that shows that the first to third reels (first to third columns 641-643) have stopped spinning and that three designated symbols 851-853 have landed in the third column 643. Fourth and fifth reels 644,645 continue to spin. Current counter value 862 is updated to the value "1441" to reflect the landing of three designated symbols relative to FIG. 7.

Figure 9:
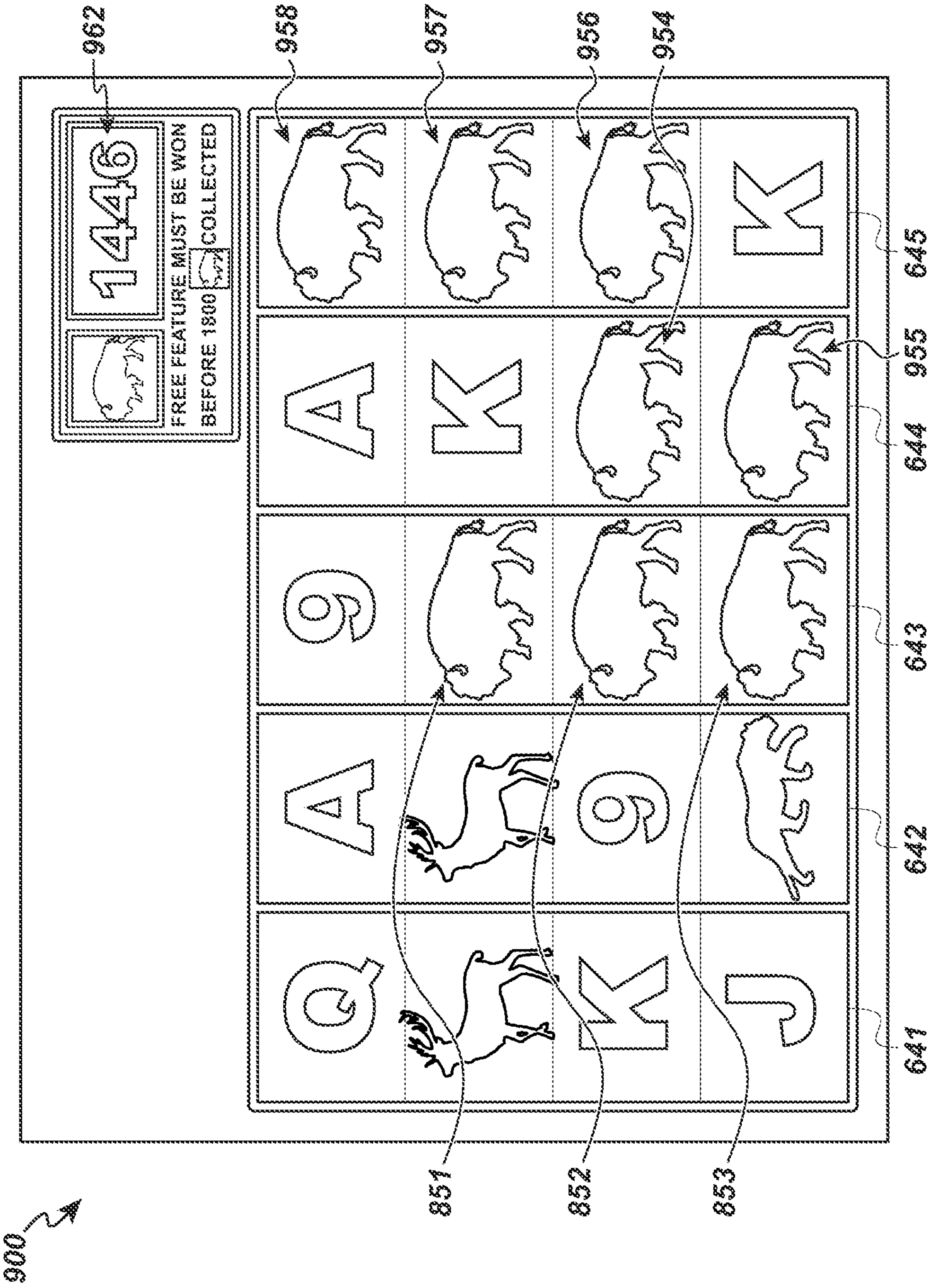

FIG. 9 is an example screen display 900 after the fourth and fifth reels (corresponding to fourth and fifth columns) have stopped spinning, and five further designated symbols 954-958 have landed in the fourth and fifth columns. Current counter value 962 has been updated by processor 204 to the value "1446" to reflect the landing of five designated symbols relative to FIG. 8.

If at step 540, there are no designated symbols, processor 204 reverts to step 532 and waits for receipt of a further wager before conducting a further game instance. In some examples, other game instances such as a free-games-based feature game may be triggered following the selection of the symbols, and the processor 204 checks whether the feature game is triggered before reverting to step 532.

At step 550, processor 204 determines whether updating the designated symbol counter has caused the trigger value stored in memory 208 to be reached (i.e., equaled or exceeded) and, if not, reverts to step 532.

If the trigger value is reached at step 550, processor 204 proceeds to step 555 and awards a feature game (i.e., some form of additional game play), in this example by randomly selecting a feature game from among a plurality of feature games, each having different characteristics. In other examples, processor 204 may award a fixed feature game. In an example, each of the feature games are triggerable from a game instance independently of the symbol counter reaching the trigger value.

In one example, processor 204 uses RNG 212 and a weighted table stored in memory to select from among three feature games. In one example, each of the feature games has the same probability of being awarded; in other examples, award of the feature games is weighted so that there are different probabilities of the feature games being selected.

Figure 10:
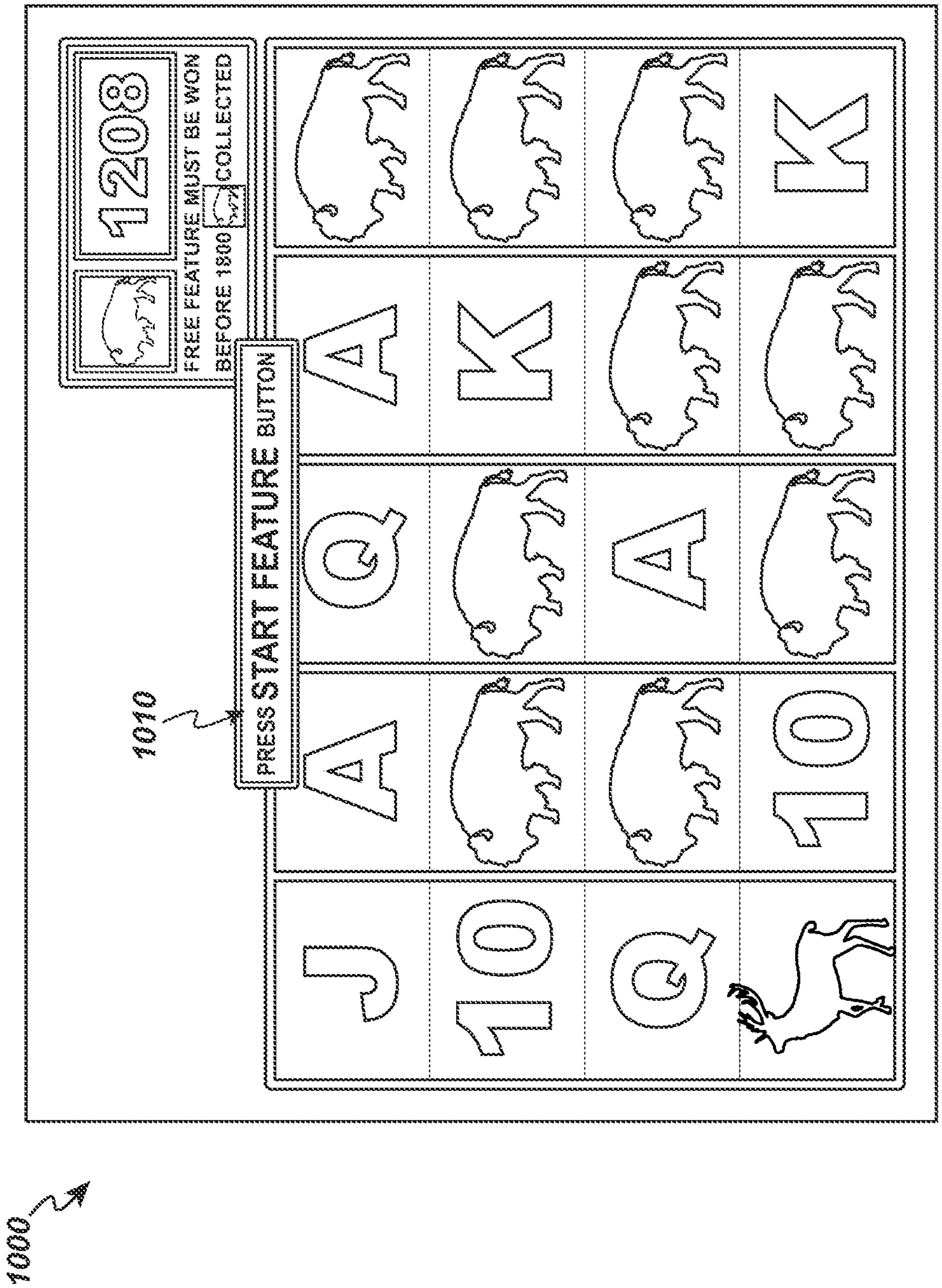

In one example, when processor 204 awards a feature game, the identity of the awarded feature game is not immediately apparent to the player. FIG. 10 shows an example screen display 1000, wherein following the award of a feature game being triggered, processor 204 control display 240 to display the message "Press start feature button" and it is only after the player presses the button that the feature game is revealed.

Figure 11:
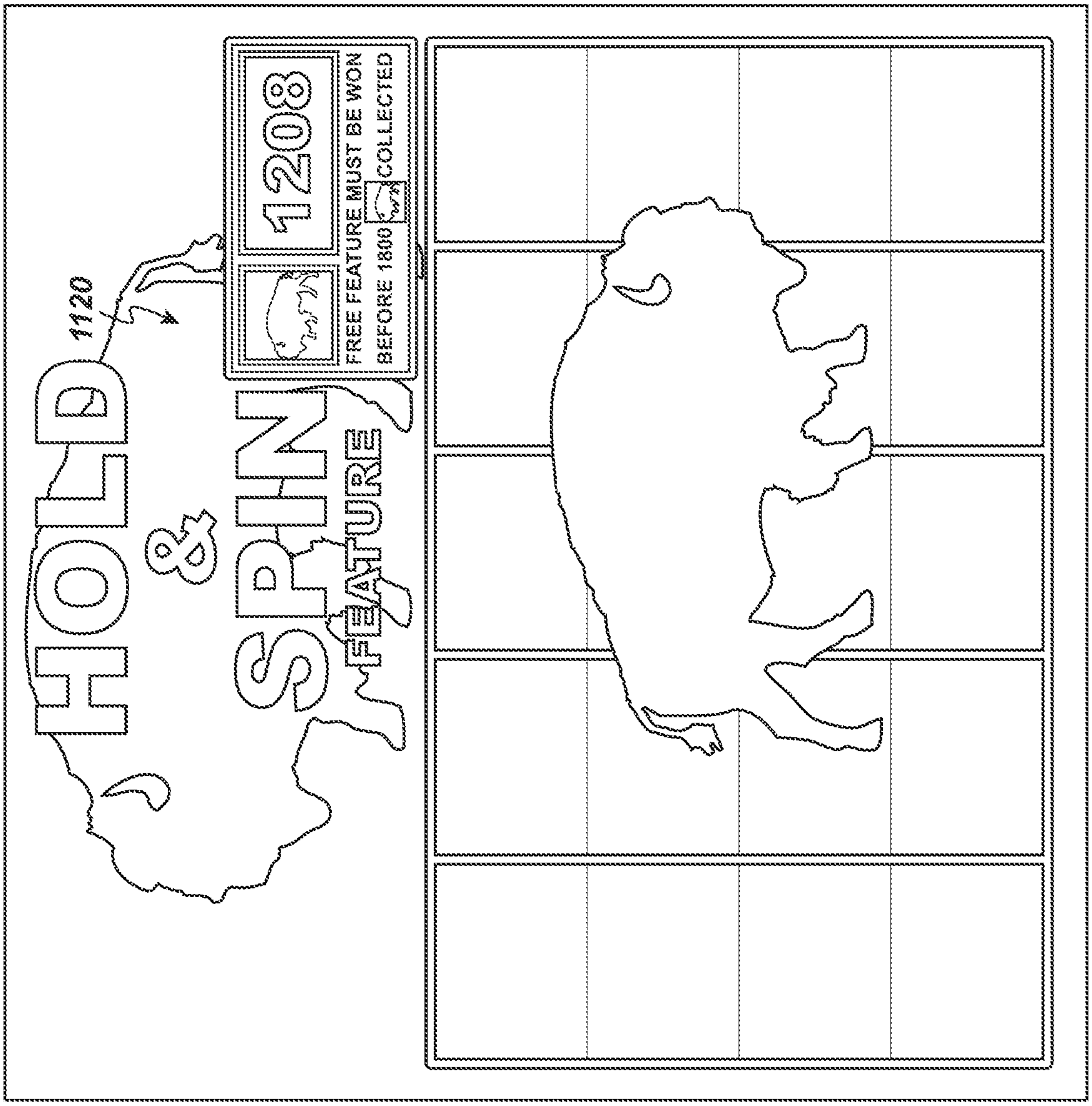
Figure 12:
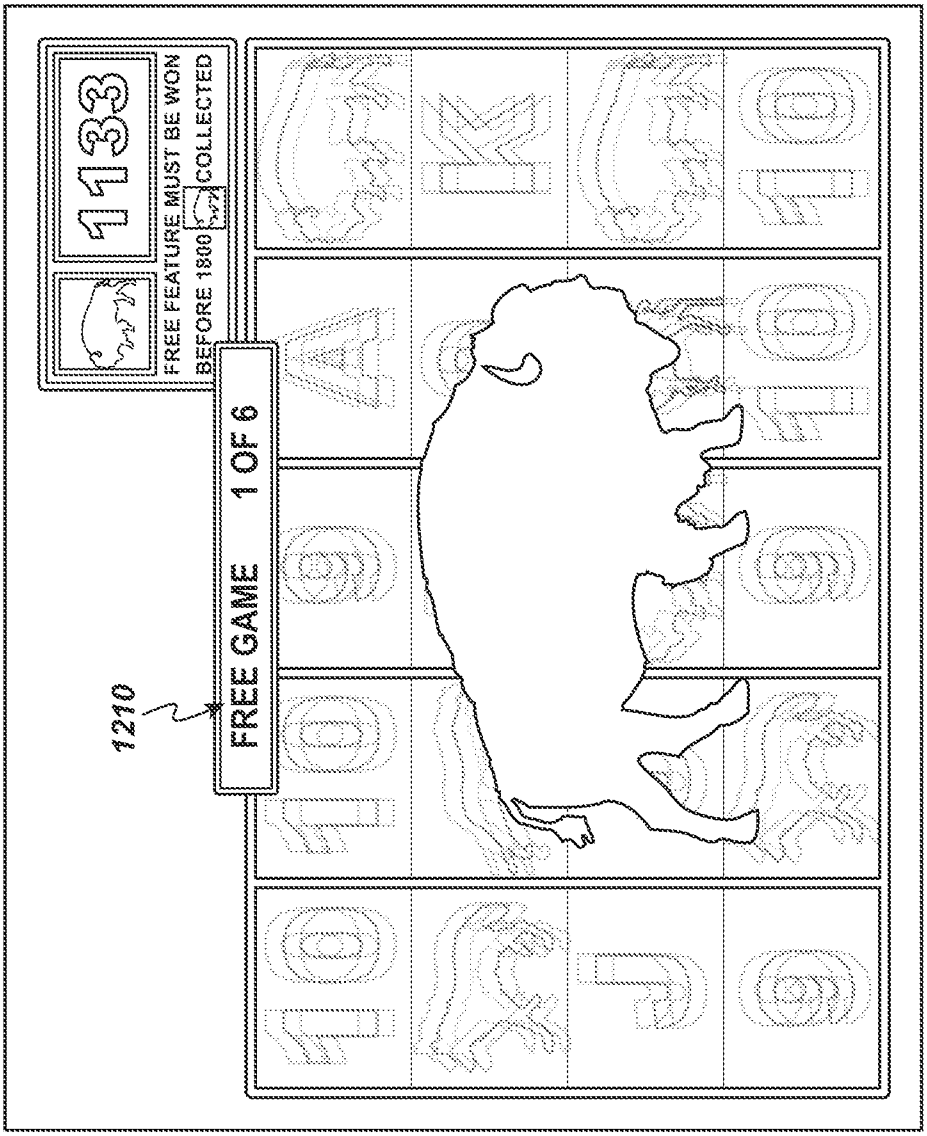

FIGS. 11 and 12 are example screen displays 1100,1200 for a hold and spin feature as indicated by "Hold & Spin Feature" message 1120 and a free games feature as indicated by "Free Game 1 of 6" message 1210 respectively.

At step 560, processor 204 conducts the awarded feature game before reverting to step 510, which will result in processor 204 determining at step 510 that a reset condition has been met. In other examples (not shown), the processor 204 conducts the awarded feature game after resetting the counter and controlling the display 240 to display the reset counter. By resetting the counter first (before conducting the awarded feature game), the collection of designated symbols re-commences during the awarded feature game (where this is part of the game play of the feature game), rather than after completion of the awarded feature game.

Accordingly, it will be appreciated that the designated symbol is collected across a plurality of game instances until the trigger value is reached and a feature game is awarded. In other examples, more than one symbol may be a designated symbol.

Figure 13:
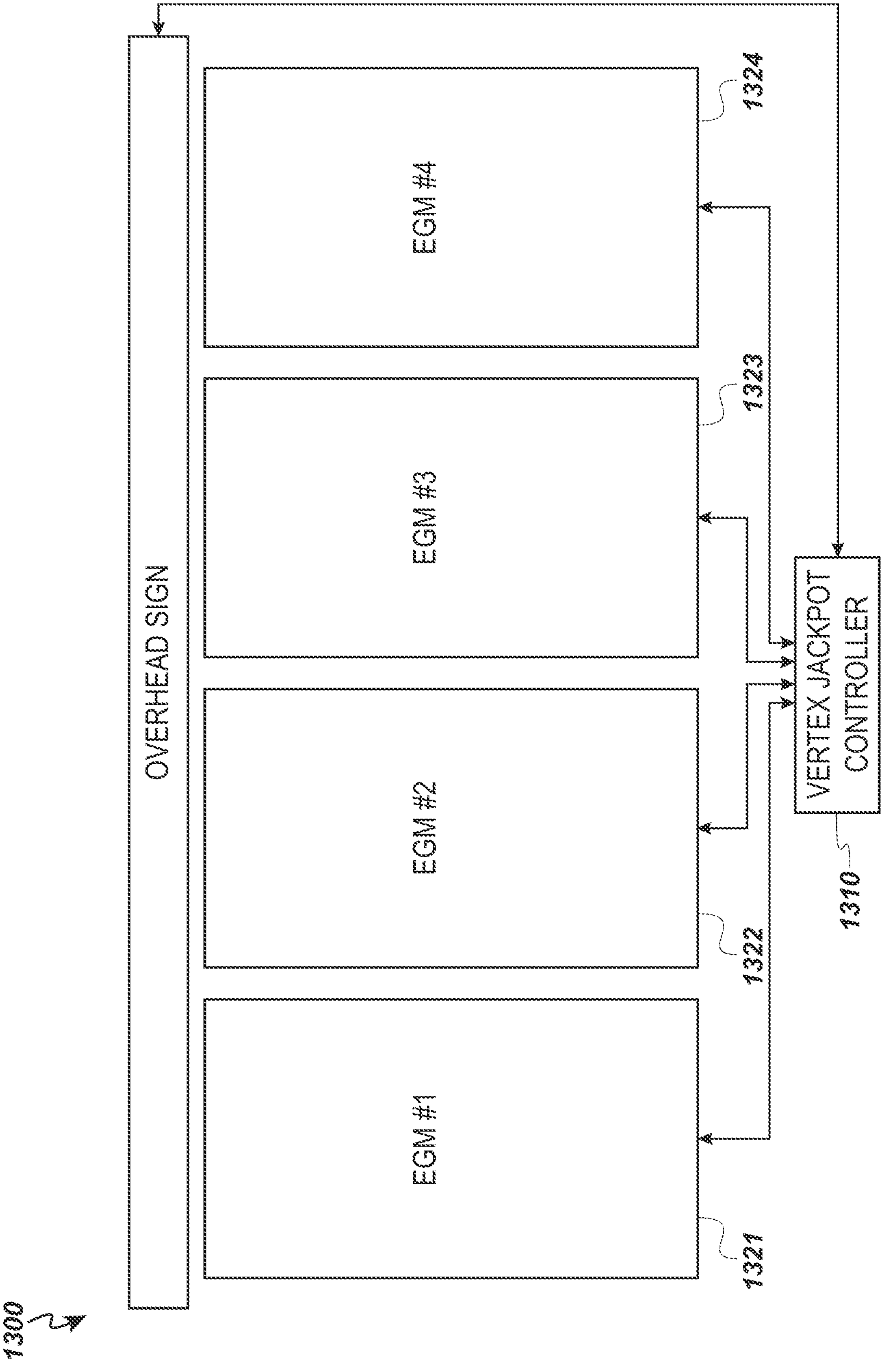
FIG. 13 is a block diagram of a gaming system of an embodiment.

FIG. 13 is an example of a gaming system 1300 in which the gaming device 200 may be deployed. In the example, four gaming devices 1321-1324 implement the method of operating a gaming device described above with reference to FIGS. 5 to 12.

Each gaming device 1321-1324 is connected to a Vertex jackpot controller 1310 (also referred to herein as a "link controller"). As indicated schematically in FIG. 13, the gaming devices 1321-1324 are arranged in close proximity to one another and in proximity to an overhead sign 1330 which is also connected to the link controller 1310. In one example, the gaming devices 1321-1324 may be arranged in a bank under a horizontal sign. In another example, the gaming devices 1321-1324 may be arranged in a cross-shaped arrangement under a circular overhead sign.

Figure 14:
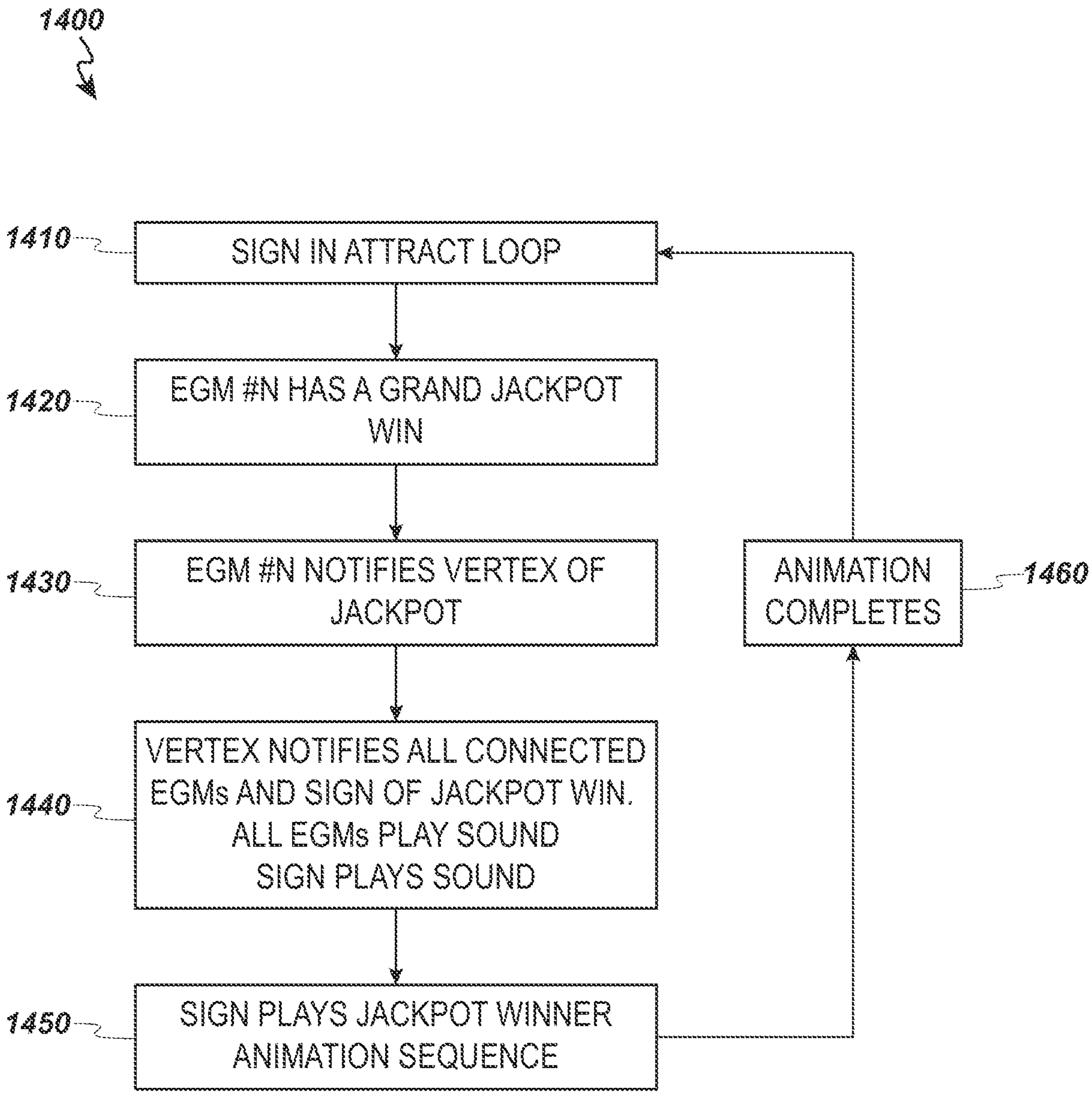
FIG. 14 is flow chart of a method of operating the gaming system of FIG. 13.

Additional functionality is incorporated into the controller 1310 and the gaming devices 1321-1324 in order to enable shared win celebrations across the gaming devices 1321-1324 and also the overhead sign 1330. As shown in FIG. 14, a method of operating 1400 the gaming system 1300 comprises the processor (not shown) of controller 1310 executing instructions of program code stored in memory (not shown) of controller 1310, in order to control the overhead sign at step 1410 to be in an "attract loop"—e.g., displaying the name of the game and/or information about the game and/or graphics related to the game to attract players to the gaming devices.

Meanwhile each active gaming deice is conducting games and displaying outcomes on their respective displays.

At step 1420, one of the gaming devices has a large win, in this example, a "Grand jackpot win," processor 204 of the respective gaming device, determines whether the win meets a defined winning condition (e.g., a category of win, a win above a threshold amount, etc.) and as a Grand jackpot win satisfies a win condition communicates occurrence of the winning condition being met at step 1430 by notifying the controller 1310 of the jackpot win.

At step 1440, the program code executed by the processor of the link controller 1310 causes the link controller 1310 to respond to a communication of the occurrence of the winning condition from one of the gaming device by communicating a win celebration command to each of the gaming devices of the plurality of gaming devices 1321-1324. In some examples, controller 1310 only outputs the win celebration command to the gaming devices other than the gaming device that had the jackpot win because the winning gaming device will already be outputting a win celebration in the form of graphics and/or sound.

The processor 204 has a routine for monitoring for communications from the link controller and responds to receipt of a win notification command by outputting a win celebration. In one example, by outputting a win celebration sound stored in memory via a speaker. In this example, the controller also controls the sign 1330 to output a win celebration sound via an associated speaker. In other examples, one or more gaming devices may output win celebration graphics, for example, if the gaming devices are inactive. In an example, the win celebration command contains data that enables gaming devices 1321-1324 to synchronize output of the win celebration. In one example, controller 1310 maintains a clock cycle corresponding to a duration of an attract sequence and outputs the current value of the clock so that gaming devices can synchronize play of an attract sequence as described below. In one example, the win celebration command includes a clock value at which the celebration sequence should be output.

At step 1450, the controller controls the sign 1330 to play an animation sequence celebrating the win. After the animation sequence completes at step 1460, controller reverts to controlling the sign 1330 to play the attract sequence at step 1410.

Figure 15:
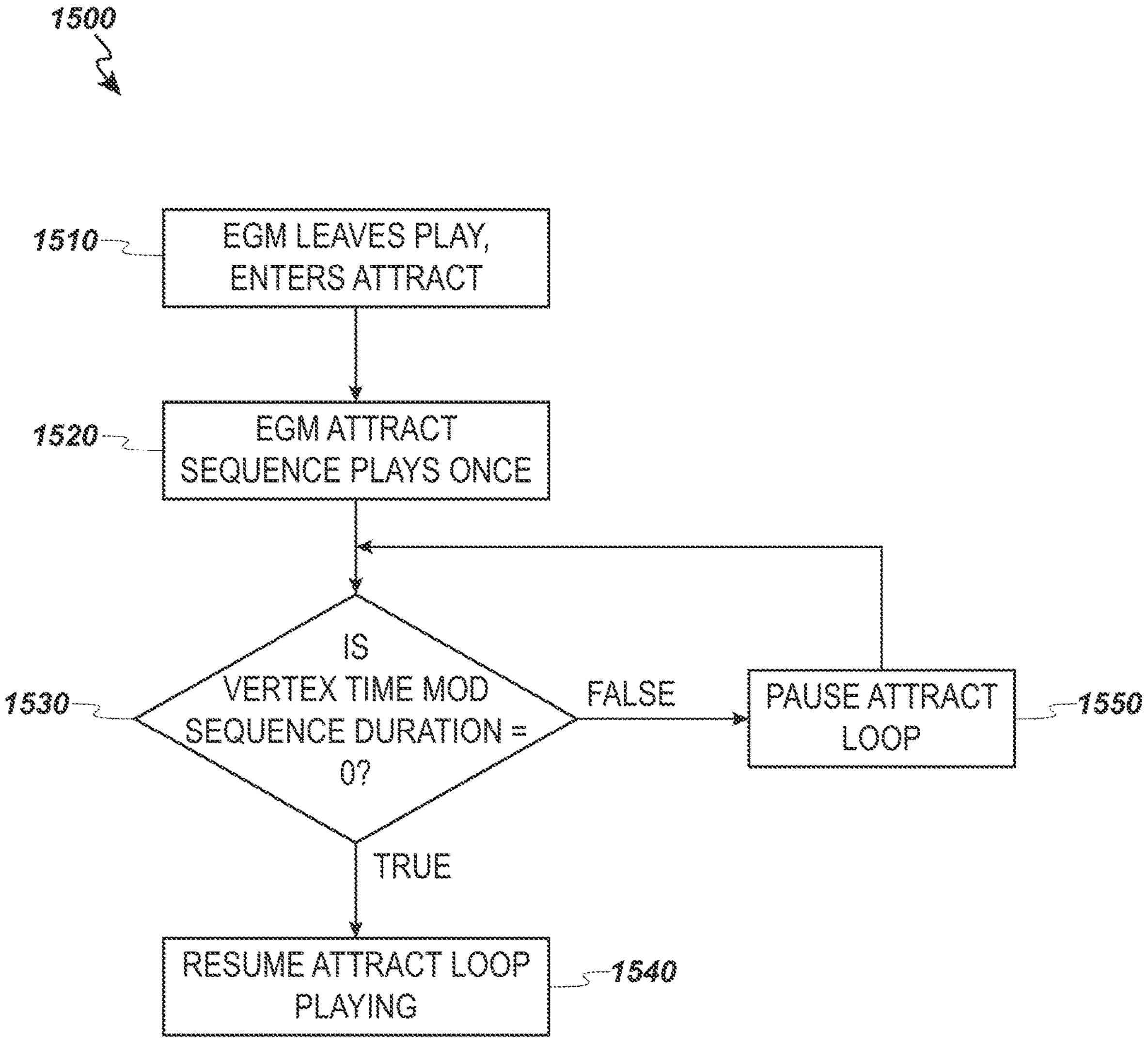
FIG. 15 is flow chart of another method of operating the gaming system of FIG. 13.

FIG. 15 is a method of operating 1500 the gaming system 1300 to synchronize play of an attract sequence on any inactive gaming devices of gaming devices 1321-1324 and sign. As indicated above, sign 1330 is controlled by controller 1310 to output an attract sequence. The attract sequence has a defined duration (e.g., 20 seconds), and controller 1310 maintains a clock cycle corresponding to the duration of the attract sequence that counts down from the defined duration to zero then restarts. Controller 1310 is configured to output the current value of the clock so that gaming devices, for example as part of a polling process for checking communications are working properly, receive the current clock value output. In one example, where the attract sequence is 30 seconds in duration, controller 1310 outputs the clock value every second as follows: 29, 28 . . . 3, 2, 1, 0, 29, 28, etc. In another example the clock value increases, for example: 0, 1, 2, 3, 4. . . . 28, 29, 0, 1, 2, 3, etc.

At step 1510, responsive to the processor of an individual gaming device determining that it is no longer being played (e.g., after a cash-out process is completed) the processor enters an attract mode. At step 1520, processor 204 controls the display of the respective gaming device to display an attract sequence that has the same length as the defined duration.

At step 1530, after a first loop of attract sequence is complete, the gaming device determines based on the clock value output by the controller 1310, whether the condition that a time modification required to be in synchronization with the attract sequence output by the controller 1310 is zero. While this remains false at step 1550 (e.g., because the attract sequence is still playing on the sign 1330), the processor 204 of the gaming device pauses the attract loop on the display of the gaming device. Once it becomes true at step 1540, the processor 204 resumes playing the attract loop but now in synchronization with the sign. For example, if a gaming device completes the first loop of attract sequence at clock value 5, the next loop of attract sequence does not commence for four further time notification from the controller 1310 (i.e., clock values 4, 3, 2, 1). Then on the next time notification (i.e., clock value 0) from the controller 1310, the gaming device commences the next loop of the attract sequence.

In addition to the claims, innovative features described herein include, but are not limited to the following:

| | Feature |
|---|---|
| A1 | A gaming device comprising:<br>a display;<br>a processor; and<br>a memory storing (i) data defining a set of reel strips; and (ii) instructions which when executed cause the processor to:<br>initialize a symbol counter in response to a reset condition being met by randomly selecting a symbol counter initial value from a defined range of allowable symbol counter initial values having an upper limit;<br>randomly select a trigger value from a range defined between the selected symbol counter initial value and a symbol counter ceiling value, wherein the ceiling value is greater than the upper limit of the range of allowable symbol counter initial values;<br>in each game instance, control the display to display a current value of the symbol counter and the ceiling value of the symbol counter, select symbols from the set of reel strips for display on the display in a plurality of columns of symbol positions, and increment the symbol counter based on a number of designated symbols included in the selected symbols; and<br>responsive to the symbol counter reaching the trigger value, award a feature game. |
| A2 | The gaming device as in A1, wherein awarding a feature game comprises the processor randomly selecting between a plurality of feature games, each having different characteristics. |
| A3 | The gaming device as in A2, wherein each of the feature games are triggerable from a game instance independently of the symbol counter reaching the trigger value. |
| A4 | The gaming device as in any one of A1 to A3, wherein a reset condition is the symbol counter reaching the trigger value. |
| A5 | The gaming device as in any one of A1 to A3, wherein a reset condition is the processor detecting a new gaming session. |

-continued

| | Feature |
|---|---|
| A6 | A method of operating a gaming device comprising a display, the method comprising: initializing a symbol counter in response to a reset condition being met by randomly selecting a symbol counter initial value from a defined range of allowable symbol counter initial values having an upper limit; randomly selecting a trigger value from a range defined between the selected symbol counter initial value and a symbol counter ceiling value, wherein the ceiling value is greater than the upper limit of the range of allowable symbol counter initial values; in each game instance, controlling the display to display a current value of the symbol counter and the ceiling value of the symbol counter, select symbols from a set of reel strips for display on the display in a plurality of columns of symbol positions, and incrementing the symbol counter based on a number of designated symbols included in the selected symbols; and responsive to the symbol counter reaching the trigger value, awarding a feature game. |
| A7 | The method as in A6, wherein awarding a feature game comprises the processor randomly selecting between a plurality of feature games, each having different characteristics. |
| A8 | The method as in A7, wherein each of the feature games are triggerable from a game instance independently of the symbol counter reaching the trigger value. |
| A9 | The method as in any one of A6 to A8, wherein a reset condition is the symbol counter reaching the trigger value. |
| A10 | The method as in any one of A6 to A8, wherein a reset condition is the processor detecting a new gaming session. |
| A11 | A gaming system comprising: one or more processors; and at least one memory storing (i) data defining a set of reel strips; and (ii) instructions which when executed cause the one or more processors to: initialize a symbol counter in response to a reset condition being met by randomly selecting a symbol counter initial value from a defined range of allowable symbol counter initial values having an upper limit; randomly select a trigger value from a range defined between the selected symbol counter initial value and a symbol counter ceiling value, wherein the ceiling value is greater than the upper limit of the range of allowable symbol counter initial values; in each game instance, control a display to display a current value of the symbol counter and the ceiling value of the symbol counter, select symbols from the set of reel strips for display on the display in a plurality of columns of symbol positions, and increment the symbol counter based on a number of designated symbols included in the selected symbols; and responsive to the symbol counter reaching the trigger value, award a feature game. |
| B1 | A gaming system comprising: a link controller comprising a processor, and a memory storing link controller instructions; a plurality of gaming devices, each gaming device comprising a display, a processor, and a memory storing gaming device instructions which when executed cause the respective gaming device processors to (i) conduct a game including by displaying game outcomes on the respective displays, and (ii) responsive to a defined winning condition being met, communicate occurrence of the winning condition being met to the link controller, wherein when the link controller instructions are executed by the processor of the link controller, they cause the link controller to respond to a communication of the occurrence of the winning condition from one of the plurality of gaming devices by communicating a win celebration command to at least each other gaming device of the plurality of gaming devices, and wherein when the gaming device instructions are executed by the gaming device processors, they cause at least each other gaming device to respond to receipt of the win celebration command by outputting a win celebration. |
| B2 | The gaming system as in B1, wherein each gaming device comprises at least one speaker, and when the gaming device instructions are executed they cause at least each other gaming device to output the win celebration by outputting a celebration sound via their respective at least one speaker. |
| B3 | The gaming system as in B1 or B2, wherein the win celebration command comprises data to enable the plurality of gaming devices to output the win celebration in synchronization. |
| B4 | The gaming system as in any one of B1 to B3, wherein the win celebration command is sent to all of the plurality of gaming devices. |
| B5 | A method of operating a gaming system comprising a link controller and a plurality of gaming devices, each gaming device comprising a display, the method comprising: operating each active gaming device of the plurality of gaming devices to conduct a game including by displaying game outcomes on the display of the respective gaming device; responsive to a defined winning condition being met at one of the gaming devices, communicating occurrence of the winning condition being met to the link controller; |

-continued

| | Feature |
|---|---|
| | responding, by the link controller, to a communication of the occurrence of the winning condition from one of the plurality of gaming devices by communicating a win celebration command to each other gaming device of the plurality of gaming devices; and<br>responding, by at least each other gaming device to receipt of the win celebration command, by outputting a win celebration. |
| B6 | The method as in B5, wherein each gaming device comprises at least one speaker, and wherein outputting the win celebration comprises outputting a celebration sound via the at least one speaker of the respective gaming devices. |
| B7 | The method as in B5 or B6, comprising outputting the win celebration in synchronization based on data of the win celebration command. |
| B8 | The method as in any one of B5 to B7, comprising sending the win celebration command to all of the plurality of gaming devices. |

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

We claim:

1. A gaming system comprising one or more processors and memory, the memory storing computer-executable instructions which, when executed, cause the one or more processors to perform operations comprising:

initializing a symbol counter in response to a reset condition being met, including randomly selecting an initial value of the symbol counter from a range of allowable symbol counter initial values having a limit;

randomly selecting a trigger value from a range defined between the selected initial value of the symbol counter and a defined value of the symbol counter, wherein the defined value of the symbol counter is past the limit of the range of allowable symbol counter initial values; and starting a feature in one or more instances when a current value of the symbol counter reaches the trigger value.

2. The gaming system of claim 1, wherein the reset condition is the current value of the symbol counter reaching the trigger value.

3. The gaming system of claim 1, wherein the current value of the symbol counter persists between gaming sessions until the reset condition is met.

4. The gaming system of claim 1, wherein the reset condition is at least one of:

a start of a new gaming session; or initialization of the gaming system.

5. The gaming system of claim 1, wherein the randomly selecting the initial value of the symbol counter uses a random number generator to return a value between a start number and an end number that defines the range of allowable symbol counter initial values.

6. The gaming system of claim 1, wherein the limit of the range of allowable symbol counter initial values is an upper limit of the range of allowable symbol counter initial values.

7. The gaming system of claim 6, wherein the defined value of the symbol counter is a ceiling value greater than the upper limit of the range of allowable symbol counter initial values.

8. The gaming system of claim 1, wherein the randomly selecting the trigger value uses a random number generator to return a value between the selected initial value of the symbol counter and the defined value of the symbol counter.

9. The gaming system of claim 1, wherein the operations further comprise instructing an electronic device to display the feature on a display.

10. The gaming system of claim 1, wherein the operations further comprise selecting symbols from a set of reel strips for display including, for each reel strip of the set of reel strips:

obtaining a value from a random number generator;

mapping the value to a reel position of the reel strip; and identifying selected symbols in the reel strip using the reel position.

11. The gaming system of claim 1, wherein the operations further comprise randomly selecting the feature from multiple features using:

a random number generator; and a weighted table.

12. The gaming system of claim 11, wherein each of the multiple features is triggerable from the one or more instances independently of the current value of the symbol counter reaching the trigger value.

13. The gaming system of claim 1, wherein the operations are performed by a server that instructs an electronic device to display the feature on a display.

14. The gaming system of claim 1, wherein the operations further comprise notifying a link controller of a start of the feature, the link controller being connected to a plurality of gaming devices.

15. A method of controlling a user interface of an electronic gaming device implemented by at least one processor in communication with at least one memory, the method comprising:

controlling display of an initial value of a symbol counter in a counter graphic, the symbol counter having been initialized in response to a reset condition being met, with the initial value of the symbol counter having been randomly selected from a range of allowable symbol counter initial values having a limit;

controlling display of a defined value of the symbol counter in the counter graphic, the defined value of the symbol counter being past the limit of the range of allowable symbol counter initial values, and a trigger value having been randomly selected from a range defined between the initial value of the symbol counter and the defined value of the symbol counter; and controlling display of an indication of a start of a feature in one or more instances when a current value of the symbol counter reaches the trigger value.

16. The method of claim 15, further comprising dynamically updating the current value of the symbol counter as designated symbols land in the one or more instances.

17. The method of claim 16, further comprising controlling display of an indication of the designated symbols in the counter graphic.

18. A computer program product stored in a non-transitory computer readable medium, comprising:

first instructions executable by a processor to initialize a symbol counter in response to a reset condition being met, including randomly selecting an initial value of the symbol counter from a range of allowable symbol counter initial values having a limit;

second instructions executable by the processor to randomly select a trigger value from a range defined between the selected initial value of the symbol counter and a defined value of the symbol counter, wherein the defined value of the symbol counter is past the limit of the range of allowable symbol counter initial values; and third instructions executable by the processor to start a feature in one or more instances when a current value of the symbol counter reaches the trigger value.

19. The computer program product of claim 18, wherein the trigger value remains hidden.

20. The computer program product of claim 18, further comprising fourth instructions executable by the processor to omit updating the current value of the symbol counter as non-designated symbols land in the one or more instances.

* * * * *